March 21, 1967  F. J. ELLIS  3,309,782
METHOD AND APPARATUS FOR DRYING GRAIN IN A SHALLOW BIN
Filed Jan. 4, 1966  5 Sheets-Sheet 1
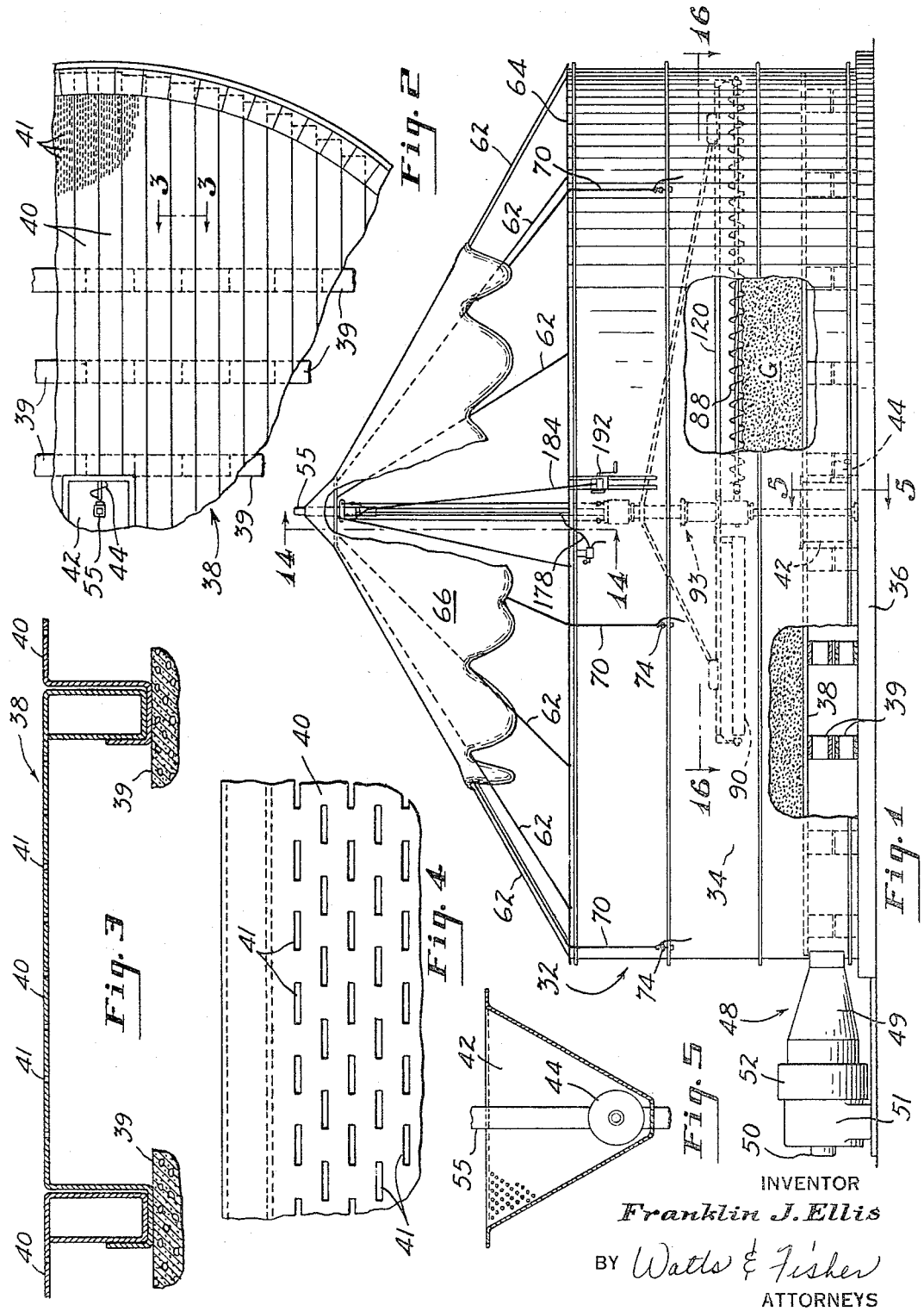
INVENTOR
*Franklin J. Ellis*
BY *Watts & Fisher*
ATTORNEYS

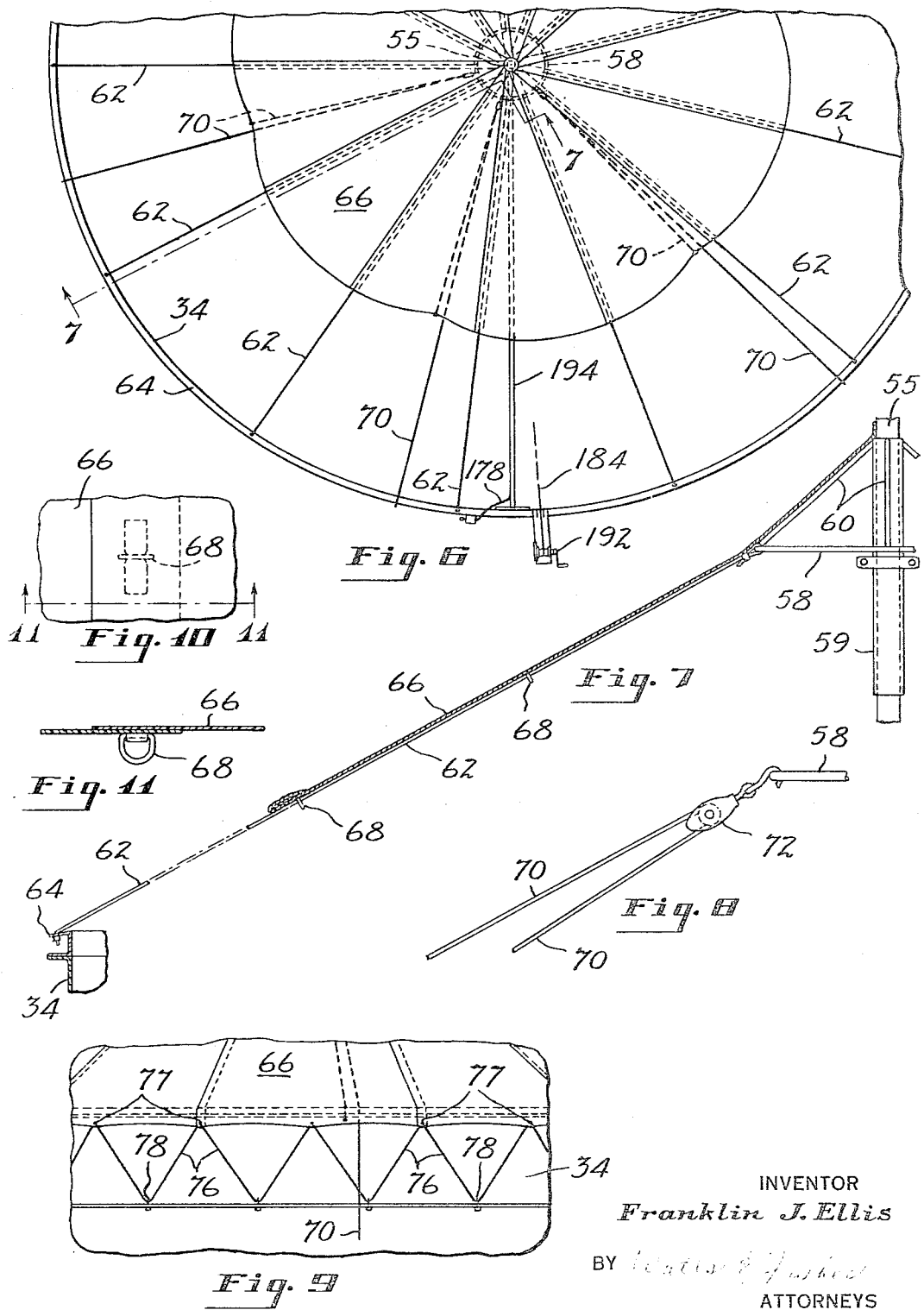

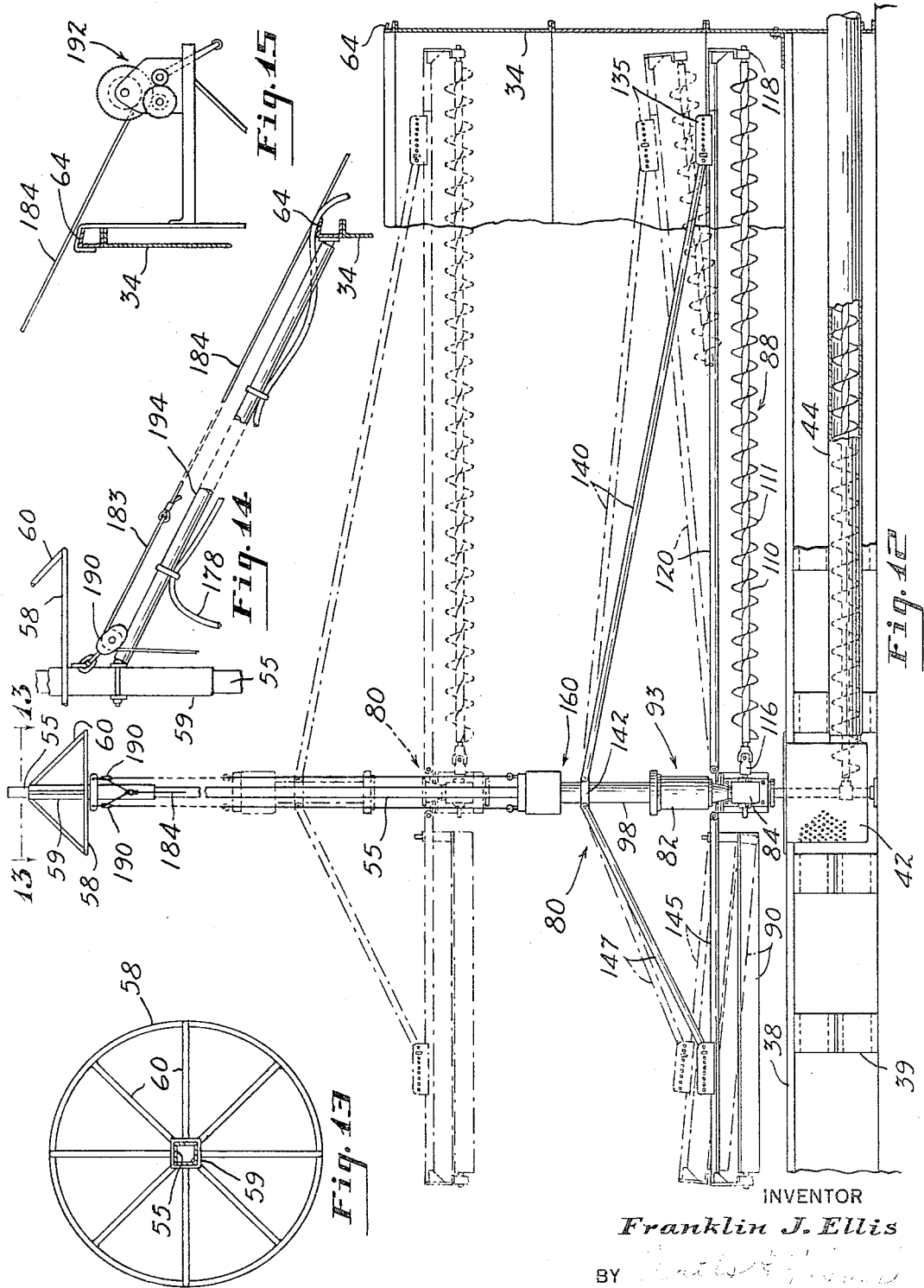

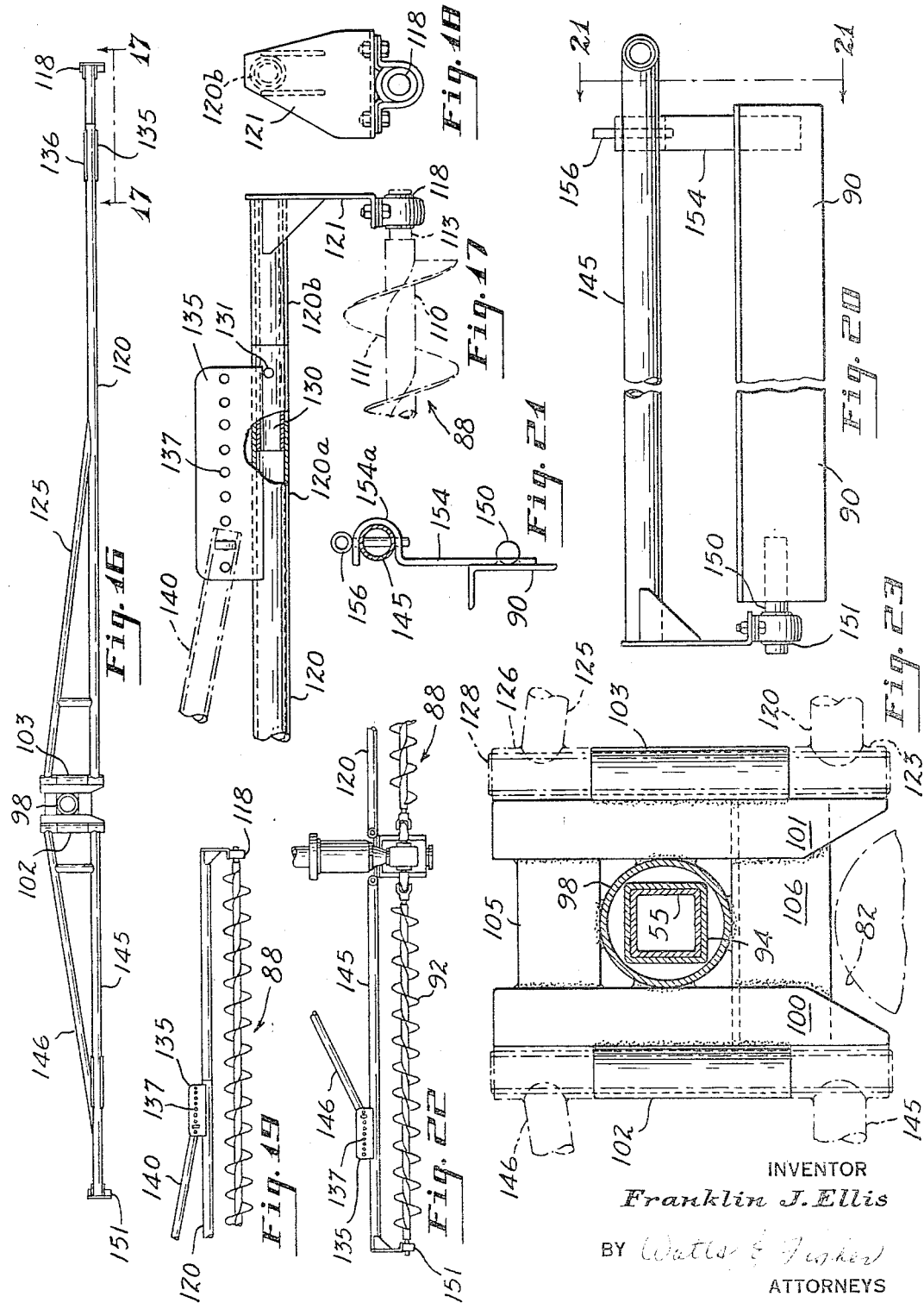

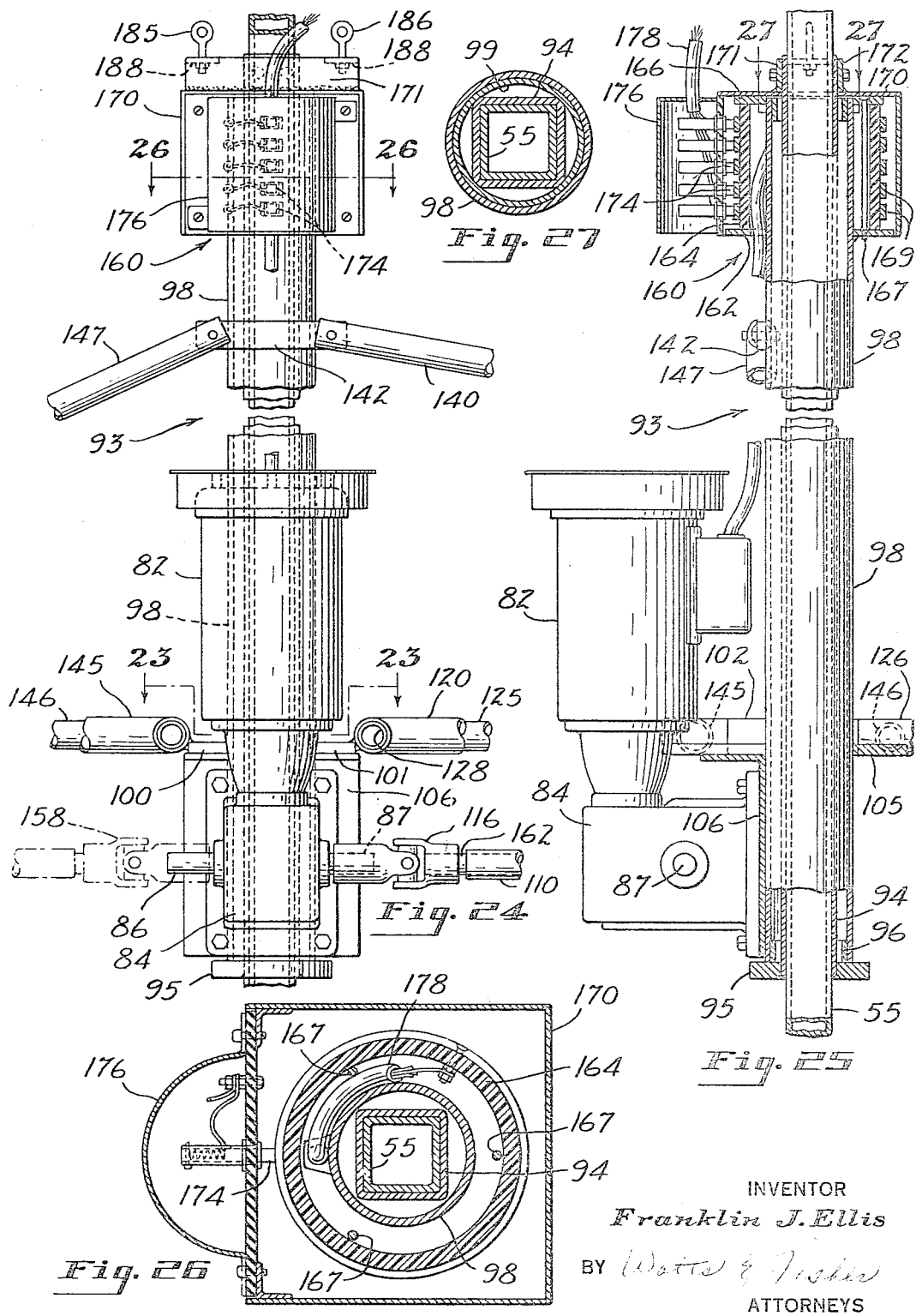

United States Patent Office 3,309,782
Patented Mar. 21, 1967

3,309,782
METHOD AND APPARATUS FOR DRYING
GRAIN IN A SHALLOW BIN
Franklin J. Ellis, 656 E. Highland,
Wooster, Ohio 44691
Filed Jan. 4, 1966, Ser. No. 518,658
12 Claims. (Cl. 34—26)

This invention relates to methods and apparatus for drying grain.

With modern farm machinery, grains can be harvested as soon as they are ripe. Such prompt harvesting is desirable because it diminishes field losses but it also creates storage problems. When grain is harvested as soon as ripe it must be dried because it contains too much moisture for safe storage. A low moisture content inhibits mold growth in stored grain. In addition, experience indicates that insect damage is materially reduced when grains are stored with a low moisture content. In general, grain must be dried from initial moisture content of up to 35% to a moisture content of 11 to 13% before it is put in storage.

In the case of corn, for example, it is becoming common farm practice to field shell the corn; that is, to separate the kernels from the cob as the corn is harvested in the field. For best results the shelled grain is then dried before it is stored or marketed.

Two basic methods of drying shelled grain are the batch drying method and the in-storage drying method. These methods utilize storage bins having elevated, perforated floors and a covered roof with a central grain inlet and air outlet. A plenum is provided under the perforated floor and a fan unit and sometimes a heating unit is provided to supply air that is forced upward through the grain and out the opening in the roof of the bin. The extent to which the grain dries depends upon the relative humidity of the drying air. The rate at which the grain dries depends upon many factors, such as the relative humidity, the rate of air flow, the moisture content of the grain, and the manner in which the grain is handled, i.e., the method that is used for drying.

Grains of moderate moisture may be dried by merely filling a bin with the grain and circulating air through the bin. The drying time for such a method is relatively long. A second alternative is referred to as "layer drying." In this system the grain is placed in the storage bin in layers. When the first layer is nearly dried, a second layer is added, and so on until the bin is filled. Supplemental heat is often used with the air circulated through the grain, the temperature being controlled by a humidistat so that the relative humidity of the drying air is maintained sufficiently low to dry the grain uniformly. Air temperatures from ambient to 20 degrees Fahrenheit above ambient are typical. Both of the above methods are relatively slow and, unless many bins are provided, may limit the harvesting rate or require intermediate storage because the thickness of each layer and hence the quantity of grain to be added in such subsequent step is limited. Additional bins or intermediate storage increase expenses.

Bin driers are also used for drying grain in batches. In such method a layer of grain 2 to 5 feet in depth is placed in the bin and heated air is circulated through the layer. Typically, the air temperature is between about 120 to 140 degrees Fahrenheit. The batch method provides increased drying capacity and allows a greater harvest rate than the layer drying method, but small quantities of grain must continually be transferred as each batch is dried.

Serious problems encountered with the above described bin systems of drying grain are the problems of condensation and the high static pressure needed to provide the necessary air circulation, particularly at high capacities. Bins used for drying grain by either the in-storage, layer drying or batch methods are substantially entirely enclosed, having a covering roof with a small central opening. Air forced from the plenum beneath the perforated floor through a quantity of grain rises to the top of the bin and escapes through the small central opening. This air is humid because of moisture which has been removed from the grain. When the air contacts the roof of the bin, much of the entrained water vapor condenses and drips or runs down the roof and side walls of the bin, back to the grain. Thus a substantial portion of the moisture separated is not evaporated from the storage bins but returned to the grain in a concentrated area adjacent the perimeter of the bin. The common result is spoilage of the grain near the perimeter of the storage space, adjacent the bin walls.

The roof and small central opening provide another serious disadvantage by restricting the flow of circulating air from the storage bin. As a result, back pressure is created in the bin above the layer of grain. This not only reduces the flow of air and the efficiency of the blower system, but also limits the flexibility of operation. For example, a higher drying rate cannot economically be obtained by merely adding another blower. Rather, a maximum rate of air circulation is quickly reached as a result of the back pressure and it becomes quite inefficient and uneconomical to attempt to increase the rate of air flow. Thus, the drying rate is essentially fixed by the size and construction of the bin.

Also in use is a high heat drying process where air at temperatures of about 180 to 240 degrees Fahrenheit is circulated through columns of grain 8 to 18 inches in width. These units are generally fast in relation to their size, because of the high temperatures. However, drying is costly and constant attention is required. In addition, the high temperature causes loss of nutrients in the grain and can also make the separation of starch, oil, gluten, and fiber in wet milling processes difficult.

In accordance with the present invention, the disadvantages described above and associated with the drying systems presently in use has been overcome, and a flexible and economical system for drying grain has been provided. The present invention contemplates the use of a relatively large diameter, shallow, roofless container having a perforated floor for supporting a layer of grain, and plenum beneath the floor supplied with air from one or more fans and heaters. An auger located radially of the container is provided to spread the grain to a desired contour. The grain to be dried is spread on the perforated floor in a layer of thickness between 3 to 6 feet. The large size of the container, which should coincide as nearly as possible with the daily harvest capacity of the user, will generally eliminate the need for a garner to provide intermediate storage of wet grain in order to match machine harvest rates. Air at a temperature of approximately 140 degrees Fahrenheit is circulated by one or more blowers to the plenum, upwardly through the layer of grain, and thence to atmosphere. Due to the open top of the container and the wide, shallow strata of grain, a relatively large flow of air may be provided without any disproportionate increase of static pressure. With this arrangement it is now feasible to provide high air flow at moderate temperatures in order to decrease drying times. Near the end of the drying cycle the heaters can be turned off and ambient air circulated to utilize the retained heat of the grain to further dry the grain as the layer of grain is cooled.

When extremely high harvest rates are experienced, the present system may be used as a pre-drier, to quickly lower the moisture content of a large quantity of grain to a level at which it may be placed in a storage bin and the drying completed in the manner described above in connection with the full bin system. This flexibility is extremely important, because only rarely will the farmer's harvest rate coincide with the rated drying rate of the drying system that he has chosen, and it is not economically feasible for him to utilize a drier that will handle his maximum capacity, which is seldom reached.

In the present invention, a layer of grain is established having essentially uniform permeability to the vertical flow of drying air. This assures uniform flow throughout the layer and, therefore, uniform drying across the layer. While obviously desirable, uniform permeability is difficult to achieve. One of the outstanding advantages of this invention is the provision of a grain layer of uniform permeability. There is considerable variation in grain size in any given volume of grain. In addition, damaged kernels and trash form a certain percentage of any volume of machine harvested grain. It is considerably harder to force air between the damaged kernels and finer particles within the layer then between larger kernels, especially when there is packing of smaller and damaged kernels and trash in localized regions. This happens, particularly where the grain is spread with an auger or discharged through a spout to the storage container. The fine, light, smaller particles are not thrown or moved as far from the spreaders as are the larger and heavier kernels. Accordingly, there is a natural tendency to establish localized regions of greater and lesser densities and permeabilities. In particular, there is a tendency to establish a central region of increased density.

Such varying permeability is avoided in accordance with the present invention by introducing the grain to a central location in the container and spreading the grain to the outer periphery of the container with a rotating auger that may be inclined upward from the horizontal, as needed. The auger pushes the incoming grain from the center toward the outer periphery of the container while it rotates about a central vertical axis. By virtue of the inclined disposition, a concave, conical upper surface is formed to the layer. The larger heavier particles of grain still tend to move farthest from the center while the smaller and damaged kernels and trash tend to remain more centrally of the container, but the increased thickness of the layer at the outer periphery compensates for the difference in permeability. As a result, the permeability of the layer is substantially uniform throughout.

A novel arrangement has been provided for supporting an auger to spread the grain in the manner described. The arrangement facilitates the use of standard pipe stock and other standard and inexpensive items to provide a sturdy yet inexpensive assembly adapted for use with drying cribs of various diameters. In addition, the arrangement includes a novel and simplified means for adjusting the angle of the auger from the horizontal and for retarding rotation of the auger in order to force the grain radially of the bin.

Another feature of this invention is the provision of a flexible top for the drier that protects the grain in the bin from the weather and yet can be opened to uncover the grain and eliminate back-pressure that hinders the circulating flow of drying air.

It is therefore an object of this invention to provide novel and improved methods and apparatus for efficiently and effectively drying grain while providing a flexible system that is readily adapted to the harvesting rate.

Other objects and attendant advantages of this invention will be readily appreciated as the invention becomes better understood by reference to the following detailed description, when considered in connection with the accompanying drawings, in which:

FIGURE 1 is a side elevational view of a grain dryer showing a circular container or bin with perforated floor, combined heater and blower, and flexible roof partially drawn toward the center to provide for free circulation of air through a layer of grain and out of the bin;

FIGURE 2 is a plan view of a fragment of the perforated floor;

FIGURE 3 is a cross-sectional view through one of the perforated metal floor planks taken on line 3—3 of FIGURE 2;

FIGURE 4 is an enlarged plan view of a portion of one of the floor planks showing perforations;

FIGURE 5 is a vertical cross-sectional view through the discharge hopper taken on line 5—5, of FIGURE 1;

FIGURE 6 is a fragmentary top plan view of the grain dryer shown in FIGURE 1;

FIGURE 7 is a vertical cross-sectional view taken on line 7—7 of FIGURE 6 showing the central support pipe or mast, the center ring and one of the guy wires or cables supporting the flexible roof;

FIGURE 8 is a fragmentary view of one of the ropes or cables attached through a pulley to the center ring and for use in pulling up the flexible roof;

FIGURE 9 is a fragmentary view of a portion of container with the roof completely covering the top and secured by means of a lace and eye bolts;

FIGURE 10 is a fragmentary view of portions of two roof segments showing the lap joint construction and a metal eye or ring construction for guiding the segments on the cables;

FIGURE 11 is a cross-sectional view taken on the line 11—11 of FIGURE 10;

FIGURE 12 is an elevational view of the grain distributing screw or auger with different working positions shown in broken lines;

FIGURE 13 is a plan view of the center ring as viewed from line 13—13 of FIGURE 12;

FIGURE 14 is a fragmentary view of the cable arrangement for raising and lowering the distributing auger assembly, taken on line 14—14 of FIGURE 1;

FIGURE 15 is an elevational view of the winch for raising and lowering the distributing auger assembly;

FIGURE 16 is a plan view of the distributing auger frame as viewed from line 16—16 of FIGURE 1;

FIGURE 17 is an elevational view of the end of the frame shown in FIGURE 16 as viewed from line 17—17 thereof;

FIGURE 18 is an end elevation of the frame shown in FIGURE 17;

FIGURE 19 is an elevational view showing how the frame shown in FIGURE 16 may be modified to accommodate screws of different lengths for different diameter containers or bins;

FIGURE 20 is a fragmentary elevational view of a retarding blade and means of attachment to the frame shown in FIGURE 16;

FIGURE 21 is a vertical cross-sectional view taken on line 21—21 of FIGURE 20;

FIGURE 22 shows a modified form of retarding device;

FIGURE 23 is an enlarged plan view partly in section as viewed from line 23—23 of FIGURE 22 showing the hinged attachment of the auger supporting pipes to the rotating slide assembly;

FIGURE 24 is an elevational view of the rotor frame carried by the slide assembly for movement up and down on the stationary supporting pipe or mast.

FIGURE 25 is a side elevation of the rotor frame slide assembly shown in FIGURE 24;

FIGURE 26 is an enlarged horizontal cross-sectional view taken on the line 26—26 of FIGURE 24; and FIGURE 27 is an enlarged horizontal cross-sectional view taken on line 27—27 of FIGURE 25.

Referring now to the drawings, an overall view of a grain dryer constructed in accordance with the present invention is shown in FIGURE 1. The dryer consists of a container 32, circular in the embodiment shown and typically 25 to 40 feet in diameter with a side wall or walls 34 typically 7 to 8 feet high. Suitably, the side wall may be constructed of conventional sheet metal sections commonly used to construct grain storage bins. The side wall 34 rests upon a concrete foundation 36. A perforated floor 38 is supported within the container 32 above the foundation 36 on spaced rows of concrete blocks 39, which rest on the foundation 36. See FIGURES 1 and 2. The floor 38 is constructed of interlocked, channeled shaped metal members 40 having rows of narrow, staggered slits 41. See FIGURES 3 and 4. The slits 41 are of a size sufficiently small to prevent the grain that is supported on the floor of the container 32 from falling through. A central hopper 42 (FIGURES 5 and 12) in the center of the perforated floor 38 communicates with a screw conveyor 44 extending beneath the floor 38 between the cavity 42 and the outside wall 34 of the container.

One or more motor-blower-heater units 48 communicate through an associated transition duct 49 with the zone above the foundation 36 and beneath the perforated floor 38. The unit 48 includes an electric motor 50, a blower 51, and a gas heater 52. When the motor 50 is operated, the blower 51 forces air under pressure, which is heated by the heater 52, into the zone beneath the perforated floor 38, to form a plenum of heated air, which is forced upwardly through the perforations 41.

Referring now to FIGURES 1, 7, 12 and 13, a square vertical support tube 55 forms a stationary mast and is supported on the foundation 36 in the center of the circular container 32. The tube 55 extends upward, above the side wall 34. A ring 58 is secured to the upper portion of the vertical support tube 55 by a surrounding sleeve 59 and extending spokes 60. Some of the spokes 60 extend in the plane of the ring and others at an angle thereto as best shown in FIGURE 12. The sleeve 59 is retained at the top of the support tube 55 by a pin (not shown). A plurality of radially extending cables 62 extend from the ring 58 to a flange 64 about the top of the side wall 34 and are fastened to the ring and flange. This supports the tube 55 in a vertical position and also provides a frame work for supporting a tent-like flexible cover 66, of suitable water proof material, such as a plastic sheet, for protecting the inside of the container 32 from the weather. The cover 66 is constructed of pie-shaped segments, with overlapping seams, as best shown in FIGURES 10 and 11. Spaced metal rings 68, one of which is shown in detail in FIGURE 11, are secured to the underside of the cover 66 and encircle the cables 62, in the manner illustrated in FIGURE 7. The center of the flexible cover 66 is secured about the top end of the support tube 55, and the lower end or periphery of the cover 66 extends down to the side wall 34 when the cover is in a lowered position. Spaced ropes 70 are secured at spaced points about the periphery of the flexible cover 66 and extend beneath the cover, upward to respective pulleys 72 carried by ring 58, and then back beneath the cover 66 and over the edge of the side wall 34. The ends of the ropes are secured to the eye bolts 74 about the outside of the side wall. When the dryer is to be operated, the ropes 70 are pulled to raise the peripheral edge of the cover 66 toward the center of the container, along the cables 62. The roof is shown partially open in FIGURES 1 and 6. The rings 68 and support cables 62 serve to guide and maintain the cover 66 in proper position during raising and lowering. The cover is always raised a sufficient distance during operation to prevent a build-up of back pressure above the grain in the dryer, and preferably is drawn well up the cables 62 to the center of the top of the circular container, providing an essentially uncovered or open container. When the cover is lowered for protection, the periphery may be secured in place about the upper flange 64 of the container with a lace 76 threaded between eyelets 77 in the cover and eye-bolts 78 about the side wall 34, as shown in FIGURE 9.

As best shown in FIGURES 12, 25 and 26, a grain distributor 80 is supported for vertical movement along the square vertical support tube 55 and for rotation in a generally horizontal plane about the vertical axis of the support tube 55. The grain distributor 80 is comprised of a reversible electric motor 82 (see FIGURES 24 and 25) that operates on alternating current, a connected gear box 84 having two oppositely disposed output shafts 86, 87, an auger 88 that extends from the central support tube 55 to the side wall 34, and a vertical blade 90 extending from the central support tube in an opposite direction from the auger 88. Alternatively, a short auger 92 may be used instead of the blade 90. The auger 88 is connected with the output shaft 87 and the auger 92, when used in lieu of the blade 90, is connected with the output shaft 86. The two output shafts rotate in the same direction. The auger 88 and blade 90 rest on top of the grain in the container during operation. Rotation of the auger 88 about its longitudinal axis cause it to roll across the top surface of the grain. The blade 90 scrapes across the grain and retards this rotation. As a result grain is forced radially of the container by the spiral blade of the auger. The short auger 92, when used, retards rotation by acting in the opposite direction from the larger auger 88.

A tubular slide support assembly 92 for the motor 82, gear housing 84, the auger 88 and the blade 90 or auger 92 is provided, as shown in FIGURES 23 to 25. The assembly slides vertically along support tube 55 and also in part rotates about the vertical axis. A square tube 94 fits over the square vertical support tube 55 in close but sliding relationship. A horizontal support plate 95 is welded to the bottom of the square tube 94. A circular pipe section 96 is carried at the bottom end of a circular pipe 98 that is supported at its lower end on the plate 95. The circular pipe section 96 is frictionally engaged by a force fit within the circular pipe 98 and closely surrounds the square tube 94, rotating about the corners of the tube 94. The upper end of the circular pipe section is similarly positioned with respect to the square tube 94 by a second circular pipe section 99. With this arrangement, the outer encircling pipe section 98 is moved vertically along with the square tube 94 by the support plate 95 and is freely rotatable about the square tube 94.

Brackets 100, 101 are welded on opposite sides of the encircling pipe section 98, diametrically opposite each other. Each of these brackets supports a pipe section 102, 103, respectively. See FIGURE 23. These pipe sections function as fixed hinge members and receive a pipe that functions as a hinge pin to secure supporting struts for the augers or the auger and blade, as will be described subsequently. A horizontally disposed reinforcing plate 105 is welded between the two brackets 100, 101 and also welded to the encircling pipe section 98 at a position displaced 90 degrees about the periphery of the pipe 98 from the brackets 100, 101. A support plate 106 is also welded to the pipe section 98, diametrically opposite from the reinforcing plate 105. The gear box 84, which supports the electric motor 82, is suitably bolted to the support plate 106, with the oppositely disposed output shafts 86, 87 extending in a horizontal plane. See FIGURE 24.

The manner in which the auger 88 and the blade 90 or the auger 92 are carried by the tubular slide assembly 93 is best shown in FIGURES 12, 16–20, 22 and 24. The auger 88 includes a longitudinal pipe 110 and a spiral blade 111. As best shown in FIGURES 24 and 17, a metal rod 112 extends from the end of the pipe 110 that is adjacent the vertical support pipe 55, and a metal rod 113 extends from the pipe 110 at the opposite end, adjacent the container side wall 34. The rod 112 is attached to one side of a universal joint 116. The other end of the universal joint 116 is attached to the output shaft 87 of the gear box 84. The rod 113 is received in a bearing 118 supported at the end of a support pipe 120 that extends parallel to and above the auger 88. The bearing 118 is carried by an end plate 121 welded to the end of the support pipe 120. The support pipe 120 is pivotally secured at the other end to the bracket 101 carried by the encircling pipe section 98.

As best shown in FIGURE 23, a short pipe section 123 is welded at right angles to the end of the support pipe 120. A strut 125 (see FIGURE 16) is welded centrally of the support pipe 120 and extends angularly toward the bracket 101 in a plane with the support pipe 120. A short pipe section 126 is welded to the end of the strut 125 in alignment with the short pipe section 123. A space between the two pipe sections 123, 126 is provided to receive the pipe section 103 welded to the bracket 101. A pipe 128 of smaller diameter than pipe sections 123, 126, and 103 is passed through the three pipe sections to function as a hinge pin connecting the support pipe 120 and strut 125 to the bracket 101. With this arrangement the support pipe 120 and auger 88 may pivot in a vertical plane about the horizontal axis of the pipe 128 to change the angle at which the auger extends from the central vertical support pipe 55.

As best shown in FIGURE 17, the support pipe 120 is made in two parts, a long portion 120a and a shorter end portion 120b. A smaller diameter pipe 130 is secured within pipe section 120b and is received in telescoping arrangement with section 120a. A pin 131 passing through two holes in section 120a secures the pipe 130 and hence the end section 120b to the longer section 120a. This permits the auger 88 to be removed from the end bearing 118 and, if additional holes are provided, can accommodate augers of different length for use with different diameter circular containers 32.

As best shown in FIGURES 16 and 17, two spaced vertical plates 135, 136 extend upwardly on each side of the pipe 120, and each contains a row of spaced holes 137. An angled supporting pipe 140 extends from between the two vertical plates 135, 136 to a bracket 142 surrounding the encircling pipe section 98. The supporting pipe 140 is secured to the bracket 142 at one end and to the vertical plates 135, 136 at the opposite end by suitable nut and bolt fasteners. The holes 137 in the vertical plates 135, 136 allow the pipe 140 to be secured at different locations along the length of the auger support pipe 120. Because the lengths of pipe 140 and pipe 120 remain constant, there is a change in the angle, in a vertical plane, at which the auger 88 and pipe 120 extend from the center support pipe 55. Thus, while the auger extends horizontally when the pipe 140 is secured to the holes of plates 135, 136 that are nearest the center pipe 55, it is inclined as shown in phantom in FIGURE 12 of the drawings when the supporting pipe 140 is secured at any of the more distant holes.

A shorter support pipe 145 and brace 146 extend from the bracket 100 in a direction opposite to that of the support 120 and brace 125. An angled support pipe 147 extends between the pipe 145 and the bracket 142. These pipes support the blade 90 or auger 92. Although shorter, the construction is otherwise identical to that associated with the support pipe 145. Where a short auger 92 is used, it is supported in the same manner as the auger 88.

The manner in which the blade 90 is supported is best shown in FIGURES 20 and 21. The blade 90 is constructed of a piece of iron angle stock. A rod 150 is attached to one side and at one end of the blade 90, and is adapted to be received in a bearing 151, which is the counterpart of bearing 118 of the longer support arm. The bearing 151 serves to support the end of auger 92 as well, in the alternative construction. The end of the blade 90 adjacent the central support pipe 55 is secured to the support pipe 145 by bracket member 154 welded to the blade 90. The bracket member 154 has a hooked upper end portion 154a that receives and partially encircles the support pipe 145. Aligned holes in the hooked portion 154 coincide with aligned holes through the support pipe 145 to receive a fastening pin 156. With this arrangement, either a blade 90 or a short auger 92 may be secured opposite the main auger 88 and be angularly adjusted to coincide with the angle at which the main auger extends from the central support shaft 55. Where a short auger 92 is utilized, it is connected by a universal joint 158 (see FIGURE 24) and rotated by the output shaft 86 of the gear box 84 in the same direction as from the main auger 88 (i.e., shafts 86 and 87 may be integral). Either the blade 90 or the rotating short auger 92 provides a resistance to rotation of the auger assembly that inhibits but does not prevent the main auger and assembly from rotating about the vertical axis of the support pipe 55. As a result of the resistance, the main auger forces grain radially of the circular container 34. At the same time, it also travels over the surface of the grain in a generally horizontal plane or shallow concave cone (depending upon the angular adjustment) about the central vertical axis of the support pipe 55.

As best shown in FIGURES 24–26, a brush and slip ring assembly 160 is carried at the top of the tubular slide assembly 93 to facilitate supplying current to the motor 82, which must rotate with the assembly about the vertical axis of the support pipe 55. The brush and slip ring assembly 160 includes an annular support plate 162 that encircles and is welded to the upper portion of the circular pipe section 98. An insulating cylinder 164 concentric with the pipe section 98 is supported on the annular support plate 162 and held in place by an annular top plate 166. Axially extending screws 167 extend within the insulating cylinder 164 between the annular top plate 166 and the support plate 162, and serve to clamp the cylinder 164 in fixed position. Five spaced commutator rings 169 are carried about the outer surface of the insulating cylinder 164 and rotate with the tubular slide assembly 93.

A stationary cover 170 surrounds the insulating cylinder 164 and slip rings 169. The cover 170 is secured by vertical, spaced plates 171, 172, which are secured by screws to the square tube 94. Five brushes 174 are supported by the stationary cover 170, spaced in a vertical row so that one brush is associated with one of the five slip rings 169. A housing 176 covers the brushes 174. With this arrangement, an electrical supply cable 178 having five separate leads is connected to the five brushes 174. The cable 178 is stationary with respect to the encircling pipe section 98, which rotates. This cable is carried from the center of the container above the auger assembly to the side wall where it is connected with a source of power. A second electrical cable 179 also having five separate leads, which are connected to the five commutator rings 169, extends from the commutator rings to the electric motor 82 and rotates with pipe section 98. In this manner, electrical current from the cable 178, which is stationary, is transmitted to the cable 179, which rotates with the motor 82 and auger assembly.

The entire auger assembly, including the auger 88, blade 90 or auger 92, gear box 84, electric motor 82, and brush and slip ring assembly 160 are all vertically movable with the tubular slide assembly 93. The tubular slide assembly is suspended from two cables 182, 183 (see FIGURE 12) that extend vertically along the square vertical support tube 55. The cables are attached to eyebolts 185, 186 (FIGURE 24) which are attached to cross pieces 188, 189 welded across the vertical plates 171, 172.

The cables 182, 183 run over pulleys 190 fixed to the top of the central vertical support tube 55 (see FIGURES 12 and 14) and are then connected to a single cable 184. Cable 184 extends to the side wall 34 where it is secured to a winch 192 secured to the side wall. (FIGURES 1 and 15.) A strut 194 extends from the vertical support tube 55 adjacent the pulleys 190 to the upper rim of the side wall 34 adjacent the winch 192 to brace the vertical support pipe 55. This maintains the support pipe 55 in a vertical and central position against the force created by the weight of the auger assembly as transmitted through the cables 182, 183, 184, which would tend to pull the central support pipe toward the winch. The strut also serves to support the electrical cable 178. It will be readily apparent that by winding the winch 192 the level of the auger assembly may be raised to distribute additional grain over the increasing depth of the layer of grain within the container 32. As shown in FIGURE 1, the auger assembly is raised above the level of the floor 38 and is at the top surface of the grain G. During unloading, as the grain is removed from the central cavity 42 by the screw conveyor 44, the auger assembly may be lowered to continually distribute grain from the upper surface and the periphery of the grain to the center.

In operation, the cover 66 is drawn to a central, upper position, uncovering the container 32. Grain to be dried is introduced into the container 34 through the open top at a generally central location on the perforated floor 38. The electric motor 82 is energized in a direction that rotates the auger 88 so that spiral blade 111 forces grain from the central portion of the container 32 toward the peripheral portion. Because either a blade 90 or a shorter auger 92 is oppositely disposed from the auger 88, the auger will not merely roll on the surface of the grain about the central vertical support axis. Rather, the blade or shorter auger will resist such tendency and grain will be forced radially of the container 32. The resistance of the scraper blade or shorter auger is insufficient to completely prevent rotation of the larger auger. The entire auger assembly therefore moves in a generally horizontal plane about the central axis of the support pipe 55 so as to spread the grain to the contour desired. As additional grain is added, the winch 192 is utilized to raise the auger assembly so that it is maintained at the upper surface of the grain and effectively distributes the incoming grain over the entire area of the dryer. A raised position of the auger assembly is shown in phantom in FIGURE 12 of the drawings.

Depending upon the variation in grain size and the percentage of trash, it is desirable to adjust the auger and blade or short auger to provide a concave upper surface on the layer of grain. This is accomplished by adjusting the ends of the angled support pipes 140 and 147 with respect to the adjustment plates carried by the auger support pipes 120 and 145. This distributes the grain into a layer of varying thickness, in which the thickness increases from the center of the container to the periphery. The smaller more closely packed particles remain at the thinner portion near the center, and the larger more loosely packed grain is located at the deeper portion of the layer, about the periphery. With some trial and error, a layer having a substantially uniform permeability may be obtained. A layer of grain of an average of three to six feet thick is established across the container 32 in this manner.

With the top of the container uncovered, the grain is dried by blowing heated air from the blower unit 48 to the plenum beneath the perforated floor 38. Typically, the temperature of the air is thermostatically controlled and maintained between about 110 and 150 degrees Fahrenheit. Typical air pressures produced in the plenum beneath the floor 38 are between 1 and 4 inches of water column and, typically, air is supplied at flow rates of between 15 and 30 cubic feet per minute per bushel of grain. The speed at which the grain is dried may be varied by using one or more additional blower units 48 about the periphery of the container. The additional pressure that is thereby created in the plenum beneath the layer of grain is effective to force a larger quantity of heated air through the layer. Air flow can be increased as much as three times over that used with in-storage drying without reaching the point where operation becomes inefficient. The principal reason this is possible is because the open top of the container prevents a build-up of back pressure above the grain layer which would otherwise oppose the increased pressure beneath the grain and reduce the flow.

By using a shallow container, usually having side walls little higher than the grain level usually no higher than 6 feet and in all events no higher than 10 feet above the perforated floor, the condensation of moisture on the side walls from the higher temperature air is minimized. Thus, essentially all of the moisture removed from the grain by the air is carried away.

When the grain has been dried, the screw conveyor 44 is power operated from outside the container and withdraws grain from the bottom central portion of the container. The rotation of the auger 88 is then reversed to grain radially from the periphery of the top of the grain layer to the center where it replaces the grain removed from the central lower portion of the layer through the screw conveyor 44.

By way of example only, in a typical operation utilizing a grain dryer as described above, harvested, shelled, corn having a moisture content of 32 percent by weight is introduced through the uncovered top of the container 32 and spread into a layer 4 feet thick in the center and 5 feet thick at the edge. The container is circular, 30.5 feet in diameter, has a side wall 6 feet high and has an essentially open top. Two 5 horsepower fans and two 1,110,000 B.t.u. heaters are provided to heat ambient air and supply the heated air under pressure to the enclosed plenum beneath the perforated floor 38. The ambient air is at an average temperature of 45 degrees Fahrenheit and the fans and heaters are run substantially constantly for a period of 19 hours. The fans alone are then run for 2½ hours to cool the grain. The corn treated yields 1950 bushels of corn having a moisture content of 13.5%.

While the present invention has been described with particularity, and certain preferred embodiments of the invention have been disclosed, numerous modifications or alteration may be made therein without departing from the spirit and scope of the invention, as set forth in the appended claims.

What is claimed is:

1. In a method of drying grain, the steps comprising: loading grain onto a perforated floor of a circular container having upstanding sides, spreading the grain to form a layer three to six feet deep and with a concave contour to the upper surface of the layer, heating air, and forcing the heated air upwardly through the perforated floor and layer of grain.

2. The method of claim 1 including the step of maintaining the zone above the grain at substantially atmospheric pressure.

3. The method of claim 2 wherein the grain is supported in a container having walls no more than 10 feet high above the air-permeable floor, circulating air heated above ambient temperature through the layer until a predetermined average moisture content of the grain is attained without regard to the uniformity of the moisture content throughout the height of the layer, and then removing the grain when it is dried to the predetermined average moisture content from the container before more grain is added.

4. The method of claim 3 including the step of circulating ambient air through the layer after heated air is circulated to cool the grain and to remove additional moisture from the grain.

5. Apparatus for drying grain comprising a circular container comprising a side wall and an air permeable floor encircled by the side wall and spaced upward from the bottom of the side wall, said side wall extending no more than 10 feet above the said floor and being larger in diameter than in height, said container constructed with a substantially open top and including an open roof frame comprised of spaced members extending upwardly and centrally of the container from the side wall, a grain spreader supported above the said floor, a vertical member that is connected with said open roof frame centrally of the container and that supports the grain spreader for rotation about the vertical axis of the vertical support, said grain spreader being vertically movable relative to the vertical member and including a rotatable auger to move grain and a blade adapted to retard rotation of the auger about the vertical axis of the vertical member, means to rotate the grain spreader, and a blower outside the upstanding sidewall constructed and arranged to move air under pressure from outside the container to within the container beneath the air-permeable floor and thence through a quantity of grain above the floor and out through the open top of the container.

6. Apparatus for drying grain comprising a circular container comprising a sidewall and an air permeable floor encircled by a sidewall and spaced upward from the bottom of the sidewall, said side wall extending no more than 10 feet above the said floor and being larger in diameter than height, said container constructed with a substantially open top, and open roof frame comprised of spaced members extending upwardly and centrally of the container from the side wall, a grain spreader supported above the said floor, a vertical member connected with said open roof frame centrally of the container that supports the grain spreader for rotation about the vertical axis of the vertical support, said grain spreader being supported for vertical movement by a slidable support assembly that encircles the vertical member and which is suspended by cable means from an upper portion of the vertical center support, said slidable assembly including a portion that rotates about the vertical axis of the vertical support and which supports the grain spreader, a motor supported by the said portion that rotates for operating the grain spreader, a non-rotating power cable, and a slip ring assembly carried by the slidabe assembly for connecting the motor with the power cable, and a blower outside the upstanding side wall constructed and arranged to move air under pressure from outside the container to within the container beneath the air permeable floor and thence through a quantity of grain above the floor and out through the open top of the container.

7. Apparatus for drying grain comprising a circular container comprising a side wall an air permeable floor encircled by the side wall and spaced upward from the bottom of the side wall, said side wall extending no more than 10 feet above the said floor and being larger in diameter than height, said container constructed with a substantially open top, an open roof frame comprised of spaced members extending upwardly and centrally of the container from the side wall, a grain spreader supported above the said floor, a vertical member that is connected with said open roof frame centrally of the container and supporting the grain spreader for rotation about the vertical axis of the vertical support, said open roof frame including cables extending from the central vertical member to the container side wall to at least in part support the vertical member, and a flexible cover in combination with the cables and slidable therealong for enclosing the top of the container with a retractable covering, means to rotate the grain spreader, and a blower outside the upstanding side wall constructed and arranged to move air under pressure from outside the container to within the container beneath the air-permeable floor and thence through a quantity of grain above the floor and out through the open top of the container.

8. Apparatus for drying grain comprising: a roofless container having a diameter greater than its height, an upstanding peripheral wall, a perforated floor located part way up the peripheral wall, means to circulate air from beneath the perforated floor through a quantity of grain on the floor and out the open top of the container, and means to spread grain over the perforated floor in a predetermined contour, said means to spread grain over the perforated floor including an auger that extends from a central area of the container to adjacent the peripheral wall, the auger being rotatable about its longitudinal axis and about a vertical axis centrally of the container, and also including a blade connected with the auger for rotation with the auger about the said vertical axis and constructed and arranged to retard rotation of the auger about the vertical axis.

9. Apparatus for drying grain comprising: a roofless container having a diameter greater than its height, an upstanding peripheral wall, a perforated floor located part way up the peripheral wall, means to circulate air from beneath the perforated floor through a quantity of grain on the floor and out the open top of the container, and means to spread grain over the perforated floor in a predetermined contour, said means for spreading grain including an auger rotatable about its longitudinal axis and also about a vertical axis located centrally of the container, said auger being constructed and arranged to be tilted upward at an angle from the central vertical axis and maintained at such angle during rotation of the auger about the central vertical axis.

10. Apparatus for drying grain comprising: a roofless container having a diameter greater than its height, an upstanding peripheral wall, a perforated floor located part way up the peripheral wall, means to circulate air from beneath the perforated floor through a quantity of grain on the floor and out the open top of the container, and means to spread grain over the perforated floor in a predetermined contour, said means to spread grain over the perforated floor in a predetermined contour including an auger that extends from a central area of the container to adjacent the peripheral wall, the auger being rotatable about its longitudinal axis and about a vertical axis centrally of the container and also including means to retard rotation of the auger about the vertical axis, and means to extend the auger from the central vertical axis at an angle from the horizontal and to maintain the auger at said angle during rotation.

11. Apparatus for spreading grain which comprises an elongated auger, means supporting the auger for rotation about the longitudinal axis of the auger and about a vertical axis, a blade, means supporting the blade for rotation about the same vertical axis as the auger, both the blade and the auger extending from the vertical axis at the same angle in a vertical plane, means connecting the blade with the auger for concurrent rotation about the said vertical axis, and means to rotate the auger about its longitudinal axis, whereby, when the auger and blade are in contact with the surface of a quantity of grain, the auger will rotate about the said vertical axis, the rotation will be retarded by the blade, and the auger will move grain along the longitudinal axis of the auger.

12. The apparatus of claim 11 wherein the auger and blade are constructed and arranged to be tilted upward at an angle from the vertical axis and including means to maintain them tilted during rotation about the vertical axis.

References Cited by the Examiner

UNITED STATES PATENTS

| | | | |
|---|---|---|---|
| 483,923 | 10/1892 | Huizer | 34—185 |
| 2,855,697 | 10/1958 | Barre | 34—46 |
| 2,983,500 | 6/1959 | Finley et al. | 263—19 |
| 3,126,198 | 3/1964 | Wise | 263—19 |

FOREIGN PATENTS

| | | |
|---|---|---|
| 192,896 | 11/1907 | Germany. |
| 398,628 | 9/1933 | Great Britain. |

FREDERICK L. MATTESON, Jr., *Primary Examiner.*

JOHN J. CAMBY, *Examiner.*